United States Patent Office 3,160,636
Patented Dec. 8, 1964

3,160,636
HALOCYCLOALKENIC DERIVATIVES OF
HALOALKENYL DIOXANES
Louis Schmerling, Riverside, Ill., assignor to Universal
Oil Products Company, Des Plaines, Ill., a corporation
of Delaware
No Drawing. Filed Oct. 12, 1961, Ser. No. 144,534
6 Claims. (Cl. 260—340.6)

This invention relates to novel compositions of matter which possess insecticidal properties and to a method for the preparation thereof. More specifically the invention is concerned with halocycloalkenic derivatives of haloalkenyl dioxanes and to a method for preparing the same.

The use of compositions of matter which possess active insecticidal or pesticidal properties has increased at a very rapid rate during the past several years. This increase in use of new products is due in part to the fact that some insects appear to have developed a resistance to certain types of insecticides thereby rendering said insecticides impotent in controlling the growth and spread of the aforesaid insects. New and different insecticidal compositions of matter must therefore be prepared and must exhibit new and effective insecticidal properties. Therefore in view of this increased use, compositions of matter which possess the necessary toxic properties towards pests and insects, and which are economical to manufacture, would be commercially attractive articles of commerce.

It is therefore an object of this invention to prepare compositions of matter possessing insecticidal properties.

A further object of this invention is to prepare insecticidal compositions of matter comprising halocycloalkenic derivatives of haloalkenyl dioxanes.

Taken in its broadest aspect one embodiment of this invention resides in a process for the preparation of a halocycloalkenic derivative of a dioxane which comprises condensing a conjugated diolefinic compound selected from the group consisting of alkadienes, cycloalkadienes, haloalkadienes and halocycloalkadienes with a haloalkenyl dioxane selected from the group consisting of those dioxanes having the generic formulae:

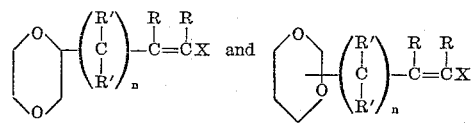

in which $n$ is an integer of from between 0 and 6, X is a halogen radical having an atomic weight of from about 35 to about 127 (i.e., chlorine, bromine and iodine) and R and R' are selected from the group consisting of hydrogen, alkyl and haloalkyl radicals, both R's being hydrogen when the diolefinic compound contains less than two hydrogen atoms, at condensation conditions, and recovering the resultant product.

Another embodiment of this invention is found in a process for the preparation of a halocycloalkenic derivative of a dioxane which comprises condensing 1,4-dichloro-1,3-butadiene with a haloalkenyl dioxane selected from the group consisting of those dioxanes having the generic formulae:

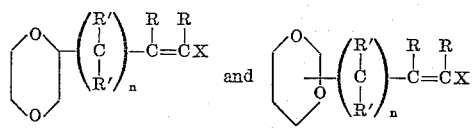

in which $n$ is an integer of from between 0 and 6, X is a halogen radical having an atomic weight of from about 35 to about 127 (i.e., chlorine, bromine and iodine) and R and R' are selected from the group consisting of hydrogen, alkyl and haloalkyl radicals, both R's being hydrogen when the diolefinic compound contains less than two hydrogen atoms, at a temperature in the range of from about 25° C. to about 250° C. and at a pressure in the range of from about atmospheric to about 100 atmospheres, and recovering the resultant product.

Yet another embodiment of this invention resides in a halocycloalkenic derivative of a dioxane.

A specific embodiment of this invention is found in a process for the preparation of a halocycloalkenic derivative of a dioxane which comprises condensing hexachlorocyclopentadiene with 2-(2-chlorovinyl)-p-dioxane at a temperature in the range of from about 25° C. to about 250° C. and at a pressure in the range of from about 1 to about 100 atmospheres, and recovering the resultant 2-(1,3,4,5,6,7,7-heptachloro-5-norbornen-2-yl)-p-dioxane.

Another specific embodiment of this invention resides in 2-(2,5,6-trichloro-3-cyclohexenyl)-p-dioxane.

Other objects and embodiments referring to alternative unsaturated compounds and alternative halo-alkenyl dioxanes will be found in the following further detailed description of this invention.

It has now been discovered that novel compounds which contain both water-soluble and fat-soluble moieties and, in addition, possess insecticidal properties, may be prepared by condensing a diolefinic compound such as a conjugated alkadiene, cycloalkadiene, haloalkadiene and halocycloalkadiene with a dioxane containing an unsaturated side chain, said unsaturated side chain being the sole reactive component of the molecule. The compounds thus formed by the process of ths invention will find a wide variety of uses in the chemical field, and when containing a plurality of halogen substituents, especially as insecticides. For example, the condensation product which results from the Diels-Alder reaction between hexachlorocyclopentadiene and 2-(2-chlorovinyl)-p-dioxane, namely, 2-(1,3,4,5,6,7,7-heptachloro-5-norbornen-2-yl)-p-dioxane will be active as an insecticide, especially against houseflies. In addition, the reaction products of this invention may also be used as intermediates in the preparation of resins, pharmaceuticals, plastics, etc. In the event that the haloalkenyl dioxane is condensed with an alkadiene or cycloalkadiene the resultant product may, if an insecticide is desired, be halogenated, and preferably chlorinated, by any means well known in the art to produce the desired product. For purposes of this invention the terms "halocycloalkene" and "halocycloalkenic" as used hereinafter in the specification and appended claims will refer to halocycloalkenes, polyhalocycloalkenes, halobicycloalkenes and polyhalobicycloalkenes.

The process of this invention in which the diolefinic compound either straight chain or cyclic, and preferably being conjugated in nature, is condensed with the haloalkenyl dioxane, is effected in a Diels-Alder manner at temperatures in the range of from about atmospheric (25° C.) to about 300° C. or more, and often preferably in a range of from about 100° to about 250° C., the temperature depending upon the reactants which undergo condensation. Generally speaking, the reaction will take place at atmospheric pressure; however, if temperatures higher than the boiling point of the reactants are to be employed, superatmospheric pressures ranging from about 2 to about 100 atmospheres or more will be used in the reaction, the amount of pressure used being necessary to maintain a portion of the reactants in the liquid phase. This superatmospheric pressure may be supplied by the addition of an inert gas such as nitrogen to the reaction zone or it may be the vapor pressure of the reactants and product. In addition, if so desired, the reaction will take place in the presence of inert organic solvents including aromatic solvents such as benzene, toluene, o-xylene, m-xylene, p-xylene, ethylbenzene, etc.; alcohols such as methyl alcohol, ethyl alcohol, propyl alcohol, etc.; ethers such as dimethyl ether, diethyl ether, dipropyl ether, etc.; paraffinic hydrocarbons both straight chain and cyclic such as pentane, hexane, heptane, cyclopentane, methylcyclopentane, cyclohexane, etc.

The dioxanes either para or meta in configuration (or as they are also commonly known, 1,4-dioxane or 1,3-dioxane) which contain a haloalkenyl side chain consisting of only carbon, hydrogen and halogen atoms which may be used as starting materials in the process of this invention possess the generic formulae:

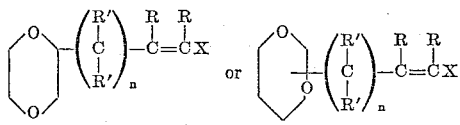

in which $n$ is an integer of from between 0 and 6, X is a halogen radical having an atomic weight of from about 35 to about 127 (i.e., chlorine, bromine or iodine) and R and R' are selected from the group consisting of hydrogen, alkyl and haloalkyl, both R's being hydrogen when the diene reactant contains less than two hydrogen atoms. It is also contemplated within the scope of this invention that the haloalkenyl side chain of the dioxane may contain more than one halogen atom, that is compounds being also used as starting materials although not necessarily with equivalent results. Some of these haloalkenyl dioxanes may be prepared by the reaction between p-dioxane or m-dioxane with a polyhaloolefin such as cis and trans-dichloroethylene, trichloroethylene, tetrachloroethylene, 1-fluoro-1,2-dichloroethylene, etc. The condensation of the polyhalo-olefins and the dioxanes is usually effected at elevated temperatures and in the presence of the catalyst which is capable of forming free radicals under the reaction conditions. Examples of catalyst which may be used include the organic peroxy compounds such as peracetic acid, persuccinic acid, dimethyl peroxide, di-t-butyl peroxide, dipropyl peroxide, acetyl peroxide, propionyl peroxide, t-butyl perbenzoate, the persulfates, perborates and percarbonates of ammonium and the alkali metals, etc. As hereinbefore set forth the reaction temperature employed in condensing the polyhaloolefin with the dioxane should be at least as high as the initial decomposition temperature of the free radical generating catalyst, such as a peroxide compound, in order to liberate and form free radicals which promote the reaction. However, the operating temperature generally does not exceed the decomposition temperature of the catalyst by more than 150° C. For example, when a free radical generating catalyst such as t-butyl perbenzoate is used, having a decomposition temperature of approximately 115° C., the operating temperature of the process is from about 115° C. to about 265° C. Higher reaction temperatures may be employed, but little advantage is gained if the temperature is higher than the hereinbefore mentioned 150° C. higher than the decomposition temperature of the catalyst. The general effect of increasing the operating temperature is to accelerate the rate of the condensation reaction between the polyhalo-olefin and the dioxane. However, the increased rate of reaction is accompanied by certain amounts of decomposition. In addition the preferred operating pressure of the process is that which is required to maintain a substantial portion of the reactants in a liquid phase and will generally range from atmospheric pressure to about 100 atmospheres or more.

Examples of the aforementioned polyhaloalkenyl dioxanes which may be used in the process of this invention include 2-(2-chlorovinyl)-p-dioxane, 2-, 4-, and 5-(2-chlorovinyl)-m-dioxane, 2-(3-chloroallyl)-p-dioxane, 2-, 4-, and 5-(3-chloroallyl)-m-dioxane, 2-(2-bromovinyl)-p-dioxane, 2-, 4-, and 5-(2-bromovinyl)-m-dioxane, 2-(3-bromoallyl)-p-dioxane, 2-, 4-, and 5-(3-bromoallyl)-m-dioxane, 2-(2-iodovinyl)-p-dioxane, 2-, 4-, and 5-(2-iodovinyl)-m-dioxane, 2-(3-iodoallyl)-p-dioxane, 2-, 4- and 5-(3-iodoallyl)-m-dioxane, 2-(3-chlorocrotyl)-p-dioxane, 2-, 4- and 5-(3-chlorocrotyl)-m-dioxane, 2-(3-bromocrotyl)-p-dioxane, 2-, 4- and 5-(3-bromocrotyl)-m-dioxane, 2-(3-iodocrotyl)-p-dioxane, 2-, 4-, and 5-(3-iodocrotyl)-m-dioxane, 2-(3-chloromethallyl)-p-dioxane, 2-, 4-, and 5-(3-chloromethallyl)-m-dioxane, 2-(3-bromomethallyl)-p-dioxane, 2-, 4-, and 5-(3-bromomethallyl)-m-dioxane, 2-(3-iodomethallyl)-p-dioxane, 2-, 4-, and 5-(3-iodomethallyl)-m-dioxane, etc. As hereinbefore stated it is also contemplated within the scope of this invention that polyhaloalkenyl dioxanes such as 2-(2,2-dichlorovinyl)-p-dioxane, 2-(1,2-dichlorovinyl)-p-dioxane, 2-(1,2-dichlorovinyl)-m-dioxane, 2-(1,2-dibromovinyl)-p-dioxane, 4-(1,2-dibromovinyl)-m-dioxane, 2-(2,2-diiodovinyl)-p-dioxane, 5-(1,2-diiodovinyl)-m-dioxane, etc., may also be used although not necessarily with equivalent results.

Diolefinic compounds which are utilized as one of the starting materials in the process of the present invention, and which contain only carbon and hydrogen atoms include straight chain conjugated diolefins such as 1,3-butadiene, 2-methyl-1,3-butadiene, 2,3-dimethyl-1,3-butadiene, 1,3-pentadiene, 2-methyl-1,3-pentadiene, 2,3-dimethyl-1,3-cyclopentadiene, 2,4-pentadiene, 2-methyl-2,4-pentadiene, 1,3-hexadiene, 2-methyl-1,3-hexadiene, 2,3-dimethyl-1,3-hexadiene, the isomeric conjugated heptadienes, octadienes, etc.; cyclic diolefins including 1,3-cyclopentadiene, 1,3-cyclohexadiene, 1,3-cycloheptadiene, the alkyl substituted conjugated cycloalkadienes such as the isomeric methyl-1,3-cyclopentadienes, etc.; halo substituted diolefins containing only carbon, hydrogen and halogen atoms including straight chain halogenated diolefins having the general formula:

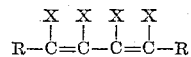

in which each of the X radicals is independently selected from the group consisting of hydrogen and halogen radicals having an atomic weight of from about 35 to about 127 (i.e., chlorine, bromine or iodine) at least one X being halogen, and each of the R radicals is independently selected from the group consisting of hydrogen and alkyl radicals containing from 1 to 6 carbon atoms, or polyhalocycloalkadienes containing only carbon, hydrogen and halogen atoms having the general formula:

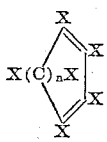

in which X has the same meaning as above. Examples of these compounds include haloalkadienes such as 1-chloro-1,3-butadiene,
1,3-dichloro-1,3-butadiene,
1-bromo-1,3-butadiene,
1,3-dibromo-1,3-butadiene,
1,3-diiodo-1,3-butadiene,
2,3-dichloro-1,3-butadiene,
2,3-dibromo-1,3-butadiene,
2,3-diiodo-1,3-butadiene,
1,2,3-trichloro-1,3-butadiene,
1,2,3-tribromo-1,3-butadiene,
1-iodo-1,3-butadiene,
1,2-diiodo-1,3-butadiene,
1,2,3-triiodo-1,3-butadiene,
1,2,3,4-tetrachloro-1,3-butadiene,
1,2,3,4-tetrabromo-1,3-butadiene,
1,2,3,4-tetraiodo-1,3-butadiene,
1,3-dichloro-2-methyl-1,3-butadiene,
2-chloromethyl-1,3-butadiene,
1,4-dichloro-2-methyl-1,3-butadiene,
1,4-dichloro-2-chloromethyl-1,3-butadiene,
1,4-dichloro-2-dichloro-methyl-1,3-butadiene,
1,3-dibromo-2-methyl-1,3-butadiene,
1,4-dibromo-2-methyl-1,3-butadiene, 1,4-dibromo-2-bromo-methyl-1,3-butadiene,
1,4-dibromo-2-dibromomethyl-1,3-butadiene,
1,4-diiodo-2-methyl-1,3-butadiene,
1,4-diiodo-2-iodomethyl-1,3-butadiene,
1,4-diiodo-2-diiodomethyl-1,3-butadiene, etc.;

and halocycloalkadienes, such as halogenated 1,3-cyclopentadienes which for purposes of this invention will be designated as halogenated cyclopentadienes including 1-, 2-, or 5-chlorocyclopentadiene, 1,5-, 5,5-, 2,3-, 1,4-, 1,2-, or 1,3-dichlorocyclopentadiene, 1,5,5-, 1,2,5- 1,3,5-, 1,2,4,- 2,5,5-, 1,4,5-, or 1,2,3-trichlorocyclopentadiene, 2,3, 5,5-, 1,2,3,5-, 1,2,4,5-, 1,2,3,4-, 1,3,5,5-, 1,2,5,5-, or 1,4,5,5-tetrachlorocyclopentadiene, 1,2,3,5,5-, 1,2,4,5,5-, or 1,2,3,4,5 - pentachlorocyclopentadiene, hexachlorocyclopentadiene, the corresponding monobromocyclopentadienes, polybromocyclopentadienes, monoiodocyclopentadienes, polyiodocyclopentadienes, etc.;

1,2-dichloro-1,3-cyclohexadiene,
1,2,3-trichloro-1,3-cyclohexadiene,
octachloro-1,3-cyclohexadiene, etc.,
1,2-dibromo-1,3-cyclohexadiene,
1,2,3-tribromo-1,3-cyclohexadiene,
octabromo-1,3-cyclohexadiene,
1,2-diiodo-1,3-cyclohexadiene,
1,2,3-triiodo-1,3-cyclohexadiene,
octaiodo-1,3-cyclohexadiene, etc.

In addition, it is also contemplated that polyhaloalkadienes and polyhalocycloalkadienes which are used in this process may contain more than one species of halo substituents such as, for example, 1,2-dichloro-3-bromo-1,3-butadiene, 1-chloro-3-bromo-1,3-butadiene, 1-iodo-3-chloro-1,3-butadiene, 2-bromo-3-chloro-1,3-butadiene, 1,3-dichloro-2-iodomethyl-1,3-butadiene, 1-chloro-2-bromocyclopentadiene, 1,3-dichloro-3-bromocyclopentadiene, 1,2-dichloro-5,5-dibromocyclopentadiene, etc., may also be used although not necessarily with equivalent results. When hexahalocyclopentadiene is used as the diolefinic compound, the dioxane derivative preferably contains a 2-chlorovinyl group (i.e., R's in the above given structural formula are hydrogen).

It is to be understood that the aforementioned diolefinic compounds are only representatives of the class of compounds which may be used and that the present invention is not necessarily limited thereto.

Examples of halocycloalkenic derivatives of haloalkenyl dioxanes which are prepared according to the process of this invention include 2-(6-chloro-3-cyclohexenyl)-p-dioxane,
2-(6-bromo-3-cyclohexenyl)-p-dioxane,
2-(6-iodo-3-cyclohexenyl)-p-dioxane,
2-(6-chloro-3-cyclohexenyl)-m-dioxane,
4-(6-bromo-3-cyclohexenyl)-m-dioxane,
5-(6-iodo-3-cyclohexenyl)-m-dioxane,
2-(2,5,6-trichloro-3-cyclohexenyl)-p-dioxane,
2-(2,5,6-tribromo-3-cyclohexenyl)-p-dioxane,
2-(2,5,6-triiodo-3-cyclohexenyl)-p-dioxane,
5-(2,5,6-trichloro-3-cyclohexenyl)-m-dioxane,
4-(2,5,6-tribromo-3-cyclohexenyl)-m-dioxane,
2-(2,5,6-triiodo-3-cyclohexenyl)-m-dioxane,
2-(2,5,6-trichloro-3-cyclohexenylmethyl)-p-dioxane,
2-(2,5,6-tribromo-3-cyclohexenylmethyl)-p-dioxane,
2-(2,5,6-triiodo-3-cyclohexenylmethyl)-p-dioxane,
2-(2,5,6-trichloro-3-cyclohexenylmethyl)-m-dioxane,
4-(2,5,6-tribromo-3-cyclohexenylmethyl)-m-dioxane,
5-(2,5,6-triiodo-3-cyclohexenylmethyl)-m-dioxane,
2-(1,3,4,5,6,7,7-heptachloro-5-norbornen-2-yl)-p-dioxane,
2-(1,3,4,5,6,7,7-heptabromo-5-norbornen-2-yl)-p-dioxane,
2-(1,3,4,5,6,7,7-heptaiodo-5-norbornen-2-yl)-p-dioxane,
2-(1,3,4,5,6,7,7-heptachloro-5-norbornen-2-yl)-m-dioxane,
4-(1,3,4,5,6,7,7-heptabromo-5-norbornen-2-yl)-m-dioxane,
5-(1,3,4,5,6,7,7-heptaiodo-5-norbornen-2-yl)-m-dioxane,
2-(1,3,4,5,6,7,7-heptachloro-5-norbornen-2-ylmethyl)-p-dioxane,
2-(1,3,4,5,6,7,7-heptabromo-5-norbornen-2-ylmethyl)-p-dioxane,
2-(1,3,4,5,6,7,7-heptaiodo-5-norbornen-2-ylmethyl)-p-dioxane,
2-(1,3,4,5,6,7,7-heptachloro-5-norbornen-2-ylmethyl)-m-dioxane,
4-(1,3,4,5,6,7,7-heptabromo-5-norbornen-2-ylmethyl)-m-dioxane,
5-(1,3,4,5,6,7,7-heptaiodo-5-norbornen-2-ylmethyl)-m-dioxane, etc.

It is to be understood that the hereinabove set forth compounds are only representatives of the class of compounds which may be obtained according to the process of this invention and that said invention is not necessarily limited thereto.

The physical properties of the present halo-cycloalkenic derivatives of haloalkenyl dioxanes and the effects they have on entomological forms of life make them particularly desirable as insecticides and insect repellents, the compounds having many of the features desired for materials of this purpose. They are, for example, toxic to insects which are destructive of plant life and materials normally subject to insect infestation, their toxic effects being manifested by contact of the poison with the insect. The insecticides comprising the compounds of the present invention are thus effective against chewing as well as sucking types of insects. In addition, the compounds are sufficiently volatile so that when applied to plant life intended for subsequent human consumption, the plants when harvested and after allowing a reasonable time for evaporation of the applied insecticides therefrom retain none of the toxicant to prevent use of the plant and consumption as food. On the other hand, the compounds are of sufficient limited volatility to be retained on the insect for the time required to accomplish the toxic effects of the compounds.

If so, desired, the insecticide of the present invention may be combined with a diluent, said diluent being employed for the specific purpose of reducing the concentration of insecticides to the desired level in specific insecticide formulation. The particular formulation of active components in combination with the solvent or dispersant will depend upon its application. Compositions containing as high as 20% of active component may be preferred in some instances to allow deep penetration of the insecticides if so desired, as in the treatment of fibrous material, such as wood, for extinction of particular infestation, for example, wood termites. For other purposes, the required concentration of active components in the formulation may be as low as 0.1% as, for example, in the treatment of fabrics for destroying moth larvae. In utilizing the present insecticidal compounds against most insects, a composition containing from about 0.1% to about 5% by weight of the active component is highly effective. The choice of the most desirable concentration depends upon the method utilized to apply the insecticidal composition to the infested article. In addition to the use of normal solvents, the insecticides may be dissolved in a suitable high boiling solvent or may be dispersed in a low molecular weight normally gaseous carrying agent such as propane, butane, the Freons, etc. The latter may be compressed and liquefied into a small bomb containing the insecticide which, upon release of pressure therefrom, vaporizes the liquid and suspends a quantity of the active component therein, thus providing a convenient spraying method of applying the insecticide.

The process of this invention may be effected in any suitable manner and may comprise either a batch or a continuous type operation. For example, when a batch type operation is used a quantity of the starting materials comprising an alkadiene, cycloalkadiene, halo-substituted alkadiene or halo-substituted cycloalkadiene along with the haloalkenyl dioxane of the type hereinbefore set forth and, if so desired, an inert organic solvent or diluent is placed in a condensation apparatus provided with heating and mixing means. The flask is then heated to the desired temperature and maintained thereat for a predetermined period of time, at the end of which time the flask and contents thereof are allowed to cool to room temperature. In the event that temperatures higher than the boiling points of the starting materials are to be used the aforesaid feed stocks are placed in the glass liner of a rotating autoclave along with the diluent and said liner is thereafter sealed into the autoclave. The desired pressure is effected by the introduction of an inert gas such as nitrogen and the apparatus is thereafter heated to the desired operating temperature. Upon completion of the predetermined residence time the autoclave and contents thereof are cooled to room temperature, the excess pressure is vented and the reaction product is separated and recovered by conventional means such as fractional distillation, crystallization, etc.

Another method of effecting the condensation reaction of the present invention is by a continuous type operation. In this type of operation the starting materials comprising the haloalkenyl dioxane and an alkadiene, cycloalkadiene, halo-substituted alkadiene or halo-substituted cycloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite and the like. If so desired, an inert organic diluent or solvent of the type hereinbefore set forth may be added through a separate line or may be admixed with one or the other of the starting materials prior to entry into said reactor and charged thereto in a single stream.

The following examples are given to illustrate the process of the present invention which, however, are not intended to limit the generally broad scope of the present invention in strict accordance therewith.

*Example I*

In this example one of the starting materials, namely, 2-(2-chlorovinyl)-p-dioxane was prepared by placing 213 g. of p-dioxane, 104 g. of cis-1,2-dichloroethylene and 10 g. of di-t-butyl perbenzoate in the glass liner of a rotating autoclave. The autoclave was sealed and heated to a temperature of approximately 130–140° C. for a period of 5.5 hours. At the end of this time the autoclave and contents thereof were cooled to room temperature and the reaction product was separated from the unreacted starting materials by fractional distillation under reduced pressure through an efficient column. The desired product comprising 2-(2-chlorovinyl)-p-dioxane boiled chiefly at 59–61° C. under 5.2 mm. pressure.

A solution of 21.6 g. of 2-(2-chlorovinyl)-p-dioxane and 61 g. of hexachlorocyclopentadiene in 57 g. of toluene was heated under reflux (a temperature of about 127° C.) for a period of about one hour. Following this 60 cc. of toluene was distilled off during a two hour period during which time the reflux temperature rose to 180° C. Refluxing was continued for an additional period of two hours at the end of which time the temperature had risen to 188° C. An additional 4 cc. of toluene was distilled off causing the temperature to rise to about 207° C. The reaction mixture was further refluxed for an additional hour, the final temperature being 214° C. The resultant dark liquid was cooled, a few drops of water and about 1 g. of potassium carbonate were added to neutralize a trace of hydrogen chloride. Distillation of the product under reduced pressure yielded a fraction boiling at 158–161° C. at 1.3 mm. pressure which comprised a mixture of crystals and viscous oil. It was recrystallized from methanol, yielding white crystalline 2-(1,3,4,5,6,7,7-heptachloro-5-norbornen-2-yl)-p-dioxane, said crystals melting at a temperature of 122–123° C.

These crystals were then analyzed with the following results.

Found: C, 31.17; H, 2.37; Cl, 57.3. Calcd. for $C_{11}H_9O_2Cl_7$: C, 31.35; H, 2.15; Cl, 58.89.

*Example II*

In this example a solution of 2-(2-chlorovinyl)-p-dioxane which has been prepared according to the process set forth in Example I and 1,3-butadiene in toluene is heated under pressure in a rotating autoclave at 150–180° C. for a period of about five hours. The autoclave is cooled to room temperature, the excess butadiene is discharged, the product is distilled and the desired final product comprising 2-(6-chloro-3-cyclohexenyl)-p-dioxane is recovered.

*Example III*

In this example a solution of 2-(2-chlorovinyl)-p-dioxane and 1,4-dichloro-1,3-butadiene is heated at a temperature of about 150–250° C. for a period of four hours after which the reaction product is subjected to fractional distillation. The desired product comprising 2-(2,5,6-trichloro-3-cyclohexenyl)-p-dioxane is recovered and recrystallized from methanol.

*Example IV*

In this example a mixture of 2-(3-chloroallyl)-p-dioxane and hexachlorocyclopentadiene is heated at 180° C. under a reflux column for ten hours. The reaction product is cooled to room temperature and subjected to fractional distillation. The desired product comprising 2-(1,3,4,5,6,7,7-heptachloro - 5 - norbornen-2-ylmethyl)-p-dioxane is recovered and recrystallized from methanol.

*Example V*

In this example a solution of 2-(2-chlorovinyl)-m-dioxane and 1,4-dichloro-1,3-butadiene dissolved in a solvent comprising toluene is treated in a manner similar to that set forth in Example I above. Upon completion of the predetermined steps of refluxing, withdrawal of solvent, cooling, fractional distillation and recrystallization the desired product, comprising 2-(2,5,6-trichloro-3-cyclohexenyl)-m-dioxane, is recovered.

I claim as my invention:

1. A compound selected from the group consisting of halocyclohexenyl dioxane, halocyclohexenylmethyl dioxane, halonorbornen-2-yl dioxane and halonorbornen-2-ylmethyl dioxane in which the halogen is selected from the group consisting of chlorine, bromine and iodine and having halogen on the carbon atom adjacent to the carbon atom attached to the dioxane ring.
2. 2-(6-chloro-3-cyclohexenyl)-p-dioxane.
3. 2-(2,5,6-trichloro-3-cyclohexenyl)-p-dioxane.
4. 2-(1,3,4,5,6,7,7-heptachloro - 5 - norbornen-2-yl)-p-dioxane.
5. 2-(1,3,4,5,6,7,7 - heptachloro-5-norbornen-2-ylmethyl)-p-dioxane.
6. 2,(2,5,6-trichloro-3-cyclohexenyl)-m-dioxane.

References Cited in the file of this patent

UNITED STATES PATENTS

| | | |
|---|---|---|
| 2,923,717 | Bloch et al. | Feb. 2, 1960 |
| 2,999,098 | Thompson | Sept. 5, 1961 |

OTHER REFERENCES

Fischer et al.: "J. Org. Chem.," vol. 25, pages 319–324.